(12) United States Patent
Wilke

(10) Patent No.: US 10,942,049 B2
(45) Date of Patent: Mar. 9, 2021

(54) DEVICE AND METHOD FOR DETERMINING THE FLOW VELOCITY OF A FLUID IN A HOLLOW BODY

(71) Applicant: SIKA Dr. Siebert & Kühn GmbH & Co. KG, Kaufungen (DE)

(72) Inventor: Bastian Wilke, Kassel (DE)

(73) Assignee: SIKA Dr. Siebert & Kühn GmbH & Co. KG, Kaufungen (DE)

(*) Notice: Subject to any disclaimer, the term of this patent is extended or adjusted under 35 U.S.C. 154(b) by 0 days.

(21) Appl. No.: 16/539,193

(22) Filed: Aug. 13, 2019

(65) Prior Publication Data
US 2020/0056913 A1    Feb. 20, 2020

(30) Foreign Application Priority Data
Aug. 15, 2018  (DE) .................. 10 2018 119 805.1

(51) Int. Cl.
*G01F 1/32*  (2006.01)

(52) U.S. Cl.
CPC .......... *G01F 1/3227* (2013.01); *G01F 1/3254* (2013.01)

(58) Field of Classification Search
CPC ................. G01F 1/32; G01F 1/00; G01F 1/37
See application file for complete search history.

(56) References Cited

U.S. PATENT DOCUMENTS

| 8,522,625 B2* | 9/2013 | Philipps | G01F 25/0007 73/861.52 |
| 8,683,874 B2* | 4/2014 | Limacher | G01F 1/3209 73/861.24 |
| 8,844,371 B2* | 9/2014 | Limacher | G01F 1/3209 73/861.22 |
| 9,476,741 B2* | 10/2016 | Hollmach | G01F 25/0007 |

FOREIGN PATENT DOCUMENTS

| DE | 1907037 A1 | 9/1969 |
| DE | 102013004725 A1 | 9/2014 |
| EP | 2486375 A1 | 8/2012 |
| JP | H11217744 A | 8/1999 |
| JP | 2010052731 A | 3/2010 |

OTHER PUBLICATIONS

Japanese Office Action dated Oct. 27, 2020.

* cited by examiner

*Primary Examiner* — Nathaniel T Woodward
(74) *Attorney, Agent, or Firm* — Dinsmore & Shohl LLP

(57) ABSTRACT

A device and a method for determining the flow velocity of a fluid in a hollow body, including at least one disturbance device disposed in the hollow body and at least one sensor for identifying disturbances that are induced in the flow by the disturbance device, which is disposed at a certain distance downstream in the direction of flow from the disturbance device, wherein the disturbance device includes means for generating changeable disturbances in the fluid flow.

10 Claims, 3 Drawing Sheets

DEVICE AND METHOD FOR DETERMINING THE FLOW VELOCITY OF A FLUID IN A HOLLOW BODY

REFERENCE TO RELATED APPLICATION

This application claims priority from German Patent Application No. DE 10 2018 119 805.1, filed Aug. 15, 2018, the entire content of which is incorporated herein by reference.

FIELD OF THE DISCLOSURE

The disclosure relates, on the one hand, to a device for determining the flow velocity of a fluid in a hollow body, comprising at least one disturbance device disposed in a hollow body and at least one sensor disposed at a certain distance downstream of the disturbance device in the direction of flow for identifying disturbances, which have been induced in the flow by the disturbance device, as well as, on the other hand, to a method for determining the flow velocity of a fluid in a hollow body.

BACKGROUND OF THE DISCLOSURE

Various methods for determining the flow velocity of a fluid or the volumetric flow rate in a hollow body are known from the prior art. For example, a so-called vortex meter, i.e. a vortex flow meter, is known, which has the disadvantage, however, that the measurements highly depend on the viscosity of the fluid, so that the determination of the flow velocity of fluids with a small Reynolds number and a high kinematic viscosity is not possible or difficult to implement. In addition, ultrasonic measuring devices are known, which however impose high requirements on the electronic evaluation units, because, when using the Doppler effect, the propagation differences between the sound signals are small due to the high sound velocities.

Determining the volumetric flow rate in a hollow body by means of turbines is also known. However, the turbines have a plurality of moving parts, which correspondingly leads to wear, wherein, in addition, pressure losses occur because of the use of the turbine in the flow medium.

The problem underlying the disclosure is to provide a device and a method for determining the flow velocity of a fluid, e.g. of a liquid in a hollow body, wherein both the device and the method are substantially independent of the viscosity of the fluid, so that it is also possible to determine the volumetric flow of a fluid having a small Reynolds number, i.e. a high viscosity or a low flow velocity, while taking into account the diameter of the hollow body.

In order to solve the problem, the disclosure proposes that the disturbance device should comprise means for generating changeable disturbances in the volume flow. The core of the disclosure consists in generating disturbances in the volume flow, wherein the strength of the impulses for generating a disturbance can be chosen for example depending on the viscosity of the fluid inside the hollow body.

SUMMARY OF THE DISCLOSURE

Thus, according to a first embodiment, it is provided that the disturbance device comprises a baffle body, which serves to generate disturbances in the volume flow or the flowing fluid. More specifically, it can be additionally provided, in this context, that the baffle body comprises at least one disturbing element protruding into the volume flow, the disturbance area of which can be modified. In this respect, the at least one disturbing element provides the option to emit impulses into the fluid and thus to generate disturbances in the fluid, the size of which depends e.g. on the viscosity of the fluid. The background for this is that it is necessary to induce disturbances, in particular vortices, in the fluid or the volume flow that can be detected by the at least one sensor. Naturally, it is more difficult and energy intensive to generate a disturbance, in particular a vortex, that can be detected by the sensor in highly viscous fluids than in liquids with a low viscosity, e.g. water.

In order to generate disturbances in the fluid, the first embodiment advantageously provides configuring the at least one disturbing element such that it is extendable out of the baffle body perpendicularly to the flow direction. The baffle body, which has a more specifically streamlined design has the sensor for identifying disturbances at a distance from the at least one disturbing element in the flow direction. This means that the baffle body not only features the disturbing element for generating disturbances, in particular vortices, but is additionally equipped with the sensor for identifying disturbances, which means that the at least one sensor is disposed at a distance from the at least one disturbing element in the flow direction.

Another, second embodiment provides that the baffle body comprises at least one wing-like disturbing element, which can be pivoted outward against the flow direction. A sensor for detecting the disturbances, e.g. vortices, generated by the disturbing element of the baffle body is disposed on the hollow body at a distance from the baffle body.

The advantage of this embodiment, in which the baffle body comprises not only the at least one disturbing element, but also the sensor for identifying disturbances, and of the at least one wing-like disturbing element, which is disposed against the flow direction on the pivotable baffle body, is that the respective disturbing element is continuously adjustable, i.e. can be introduced into the fluid flow in a continuous manner. This makes it possible to vary the size of the disturbance, due to the fact that the surface area introduced as a resistance into the flow is variable.

Another third embodiment is characterized in that the at least one disturbance device comprises a recess in the wall of the hollow body, inside which a displacement body, e.g. a piston, is movably disposed. In this context, the displacement body can also be a membrane. The piston head of the piston is advantageously disposed inside the recess at a distance from the lateral wall of the hollow body, wherein the displacement body, and in particular the piston, is disposed inside the recess so as to be movable parallel or transversely to the center longitudinal axis of the hollow body. By means of at least one such device located at the circumference of the pipe, disturbances can be generated by targeted agitation of the fluid at the inner wall of the hollow body, which are detected by a suitable sensor disposed at a certain distance from the disturbance device at or in the wall of the hollow body. In practice, it is also possible to dispose several such disturbance devices in the area of the inner circumference of the hollow body, which makes it possible to detect asymmetries in the flow.

A fourth embodiment is characterized in that the disturbance device comprises at least one disturbing element disposed at the wall of the hollow body, which can be introduced into the volume flow transversely to the longitudinal axis of the hollow body. Here too, it is advantageously provided that the disturbing element can be introduced into the fluid in a continuous manner transversely to the center longitudinal axis.

According to another feature of the disclosure, the sensor for identifying disturbances is configured as a pressure sensor, in particular as a piezoceramic sensor.

Another object of the disclosure is a method for determining the flow velocity in a hollow body by means of a device according to one or several of claims 1 to 15. The method according to the disclosure is characterized in that the time period between the generation of the disturbance by the disturbance device and the determination of the disturbance by the sensor can be determined, so that with a predetermined distance between the disturbance device and the sensor, the flow velocity can be determined. In this context it is more specifically provided that at least one impulse or impulse sequence is induced in the fluid by the disturbance device. The strength of the impulse can be chosen in particular as a function of the viscosity of the liquid. The background for this is that the disturbances provided in the fluid flow can thus be as differentiated as possible, and advantageously always complete separated vortices.

An impulse sequence can also be advantageously induced in the fluid flow, in order to ultimately obtain a better signal-to-noise ratio. The gap between two impulses, the gap between two impulse sequences and the length of an impulse sequence are advantageously adjustable, in order to avoid an interaction between two impulses or impulse sequences, or to minimize its consequences. This means that the sensor must enabled to detect clear signals.

According to another feature of the disclosure, generating at least one impulse or at least one impulse sequence is carried out by way a MEMS (micro electro-mechanical system), e.g. a piezoceramic element as part of the disturbance device. In this regard, the frequency of individual impulses or the frequency of impulse sequences per unit of time is advantageously controllable. The length of the impulse sequences can also be adjustable.

BRIEF DESCRIPTION OF THE DRAWINGS

In the following, the disclosure will be described in more detail based on the drawings.

DETAILED DESCRIPTION OF THE DISCLOSURE

In FIG. 1A to FIG. 5 the schematically shown hollow body is labeled 1.

Figure 1A:
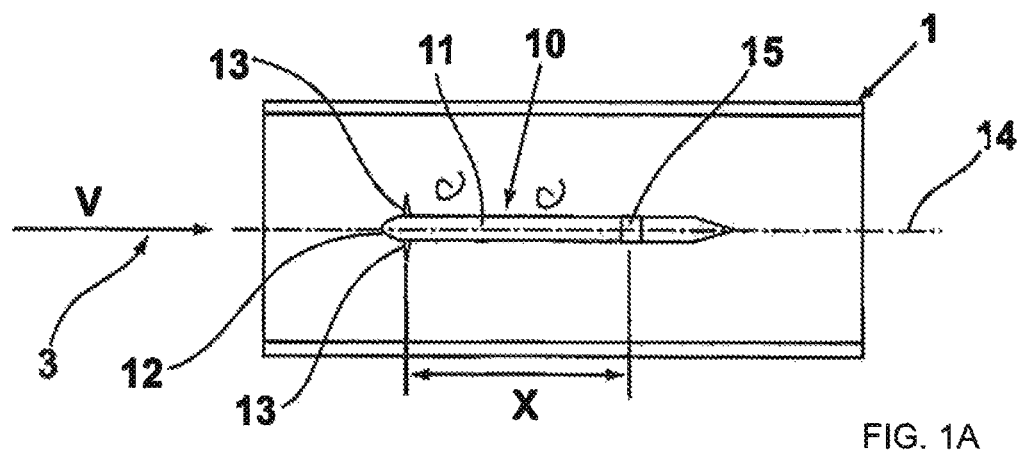
FIG. 1A is a schematic of a sectional view of a first variant of a first embodiment for determining the flow velocity in a hollow body.

The disturbance device 10 is located inside the hollow body 1 according to FIG. 1A (1st variant). The disturbance device 10 includes the disturbance body 11, wherein the disturbance body 11 comprises respectively one disturbing element 13 on its upper and lower side in the area of its nose 12, which faces the flow (arrow 3). The disturbing element 13 can be continuously extended or swung out of the baffle body 11 transversely to the center longitudinal axis 14, wherein the surface area facing the flow depends on the current extension length. In this respect, the size of the surface area influences the size of the disturbance generated in the fluid, e.g. in the form of an impulse or an impulse sequence.

The disturbance device 10 with the baffle body 11 includes the sensor 15, disposed at a distance (distance X) from the disturbing element 13, for identifying disturbances generated by the disturbing elements, and here more specifically vortices. Thus, when the flow conditions are known, the volumetric flow rate per unit of time can be determined using the time difference between the generation of the vortices by the disturbing elements at the one end of the baffle body 11 of the disturbance device 10 and the distance X between the disturbing elements 13 and the sensor 15, as well as the cross-section of the hollow body.

Figure 1B:
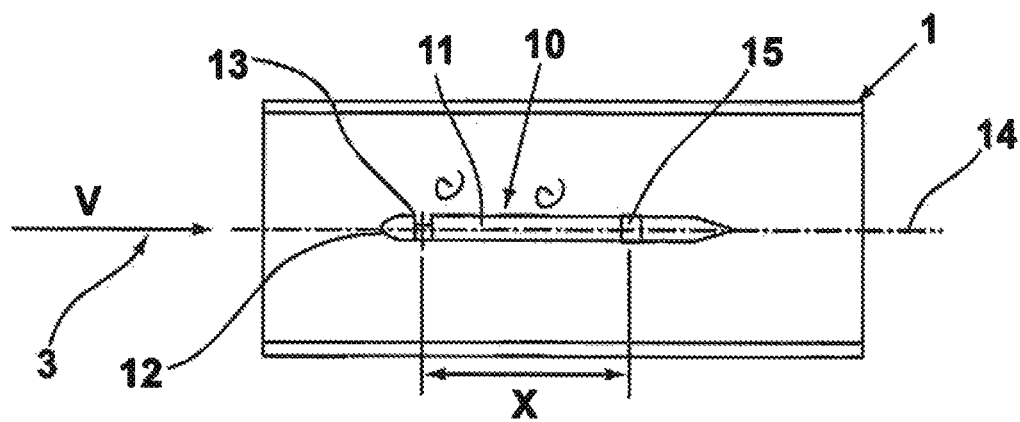
FIG. 1B is a schematic of a second variant of the first embodiment according to FIG. 1A.

FIG. 1B shows, as a second variant, an embodiment, in which the disturbing element 13 is periodically displaceable transversely to the center longitudinal axis 14, in order to form vortices, which can then be detected by the sensor 15. The disturbance can be generated by an impulse or an impulse sequence.

Figure 1C:
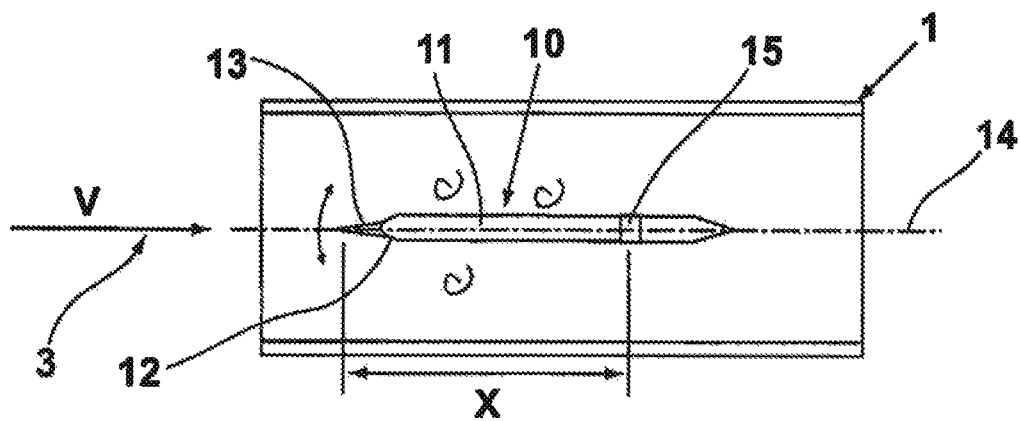
FIG. 1C is a schematic of a third variant of the first embodiment according to FIG. 1A.

FIG. 1C shows, as a third variant, an embodiment, in which the disturbing element 13 is moved back and forth in a similar way to a fin.

In the following, the same reference numbers refer to the same objects.

Figure 2:
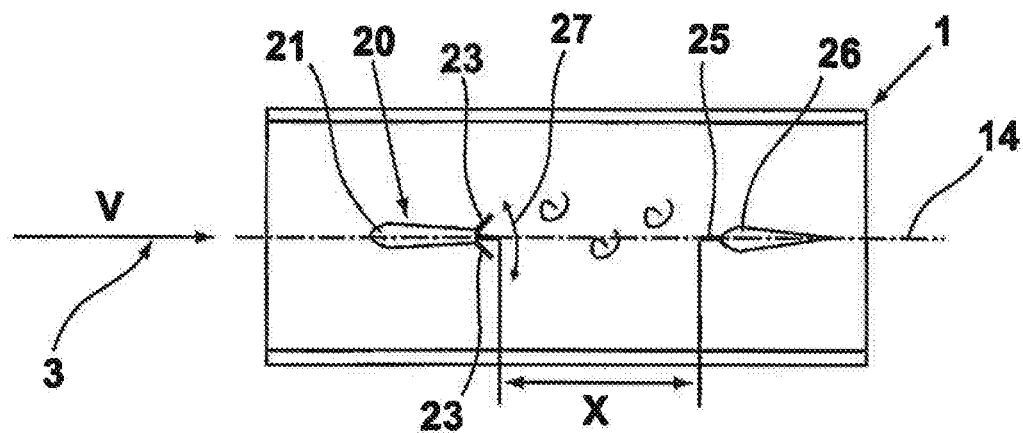
FIG. 2 is a schematic of a a sectional view of a second embodiment for determining the flow velocity in a hollow body.

FIG. 2 shows a disturbance device 20 with a baffle body 21, wherein the baffle body comprises wing-like disturbing elements 23 at its one end. namely at the end facing away from the flow, which can be swung out against the direction of flow (arrow 27). The sensor 25 for detecting the disturbances in the fluid generated by the disturbing elements is located at a distance (distance X) from the end of the baffle body 21. The sensor 25 is held by a streamlined support 26, which is disposed in the hollow body 1.

Figure 3A:
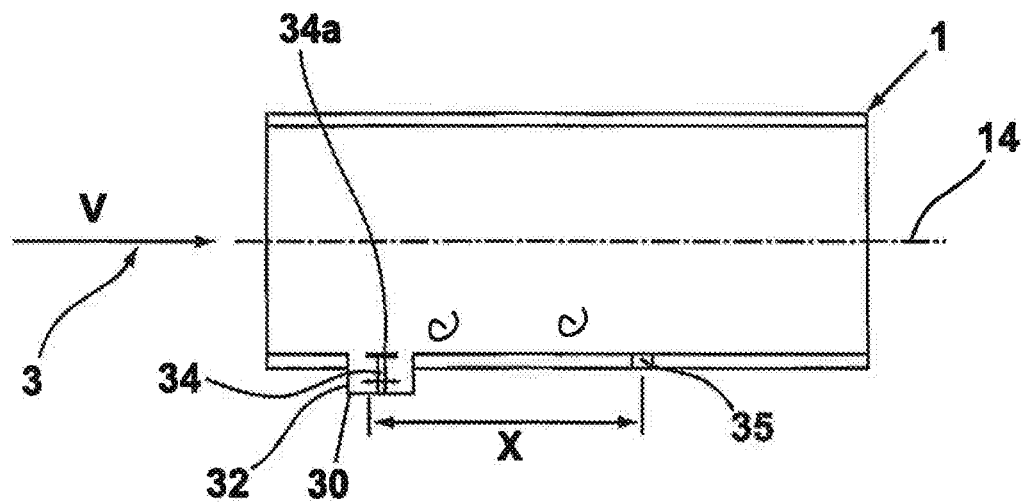
FIG. 3A is a schematic of a first variant of the device according to FIGS. 1 and 2 as a third embodiment.

FIG. 3A shows, in a first variant, a disturbance device 30 disposed in the wall of the hollow body 1, wherein the disturbance device 30 comprises a recess 32 disposed in the wall of the hollow body inside which a piston 34 is movable, as a disturbing element, parallel to the center longitudinal axis 14 of the hollow body. In this respect, the piston head 34a is disposed in the recess 32 at a distance from the lateral hollow body wall. The upper side of the piston head 34a closes the inner wall of the hollow body 1. With this embodiment it is possible to generate a targeted agitation of the fluid at the circumference of the hollow body, which induces disturbances in the fluid flowing through the hollow body, for example in the form of vortices, which can be detected by the sensor 35 disposed in the wall of the hollow body at the distance X from the piston 34. In addition, several disturbance devices, ideally evenly distributed in the circumferential direction, can be used, provided asymmetric flows are present.

Figure 3B:
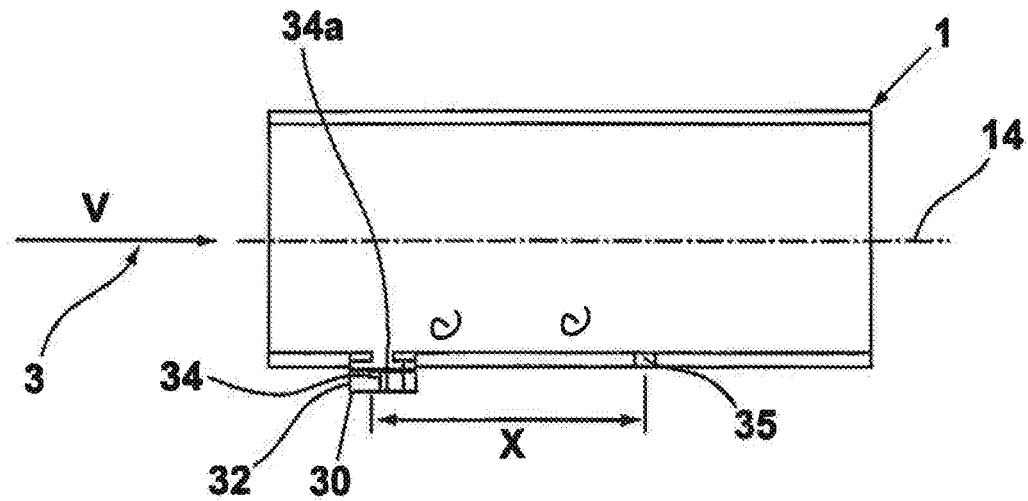
FIG. 3B is a schematic of a second variant of the device according to FIGS. 1 and 2 as a third embodiment.

FIG. 3B shows, as a second variant, how vortices can be generated by a movement of the disturbing element 13 in the wall of the hollow body in the transverse direction to the center longitudinal axis 14, which are then detected by the sensor 15 in the wall of the hollow body. Disturbances in the fluid flow can also be generated as fluid impulses or as fluid impulse sequences by the movement or movements.

Figure 4:
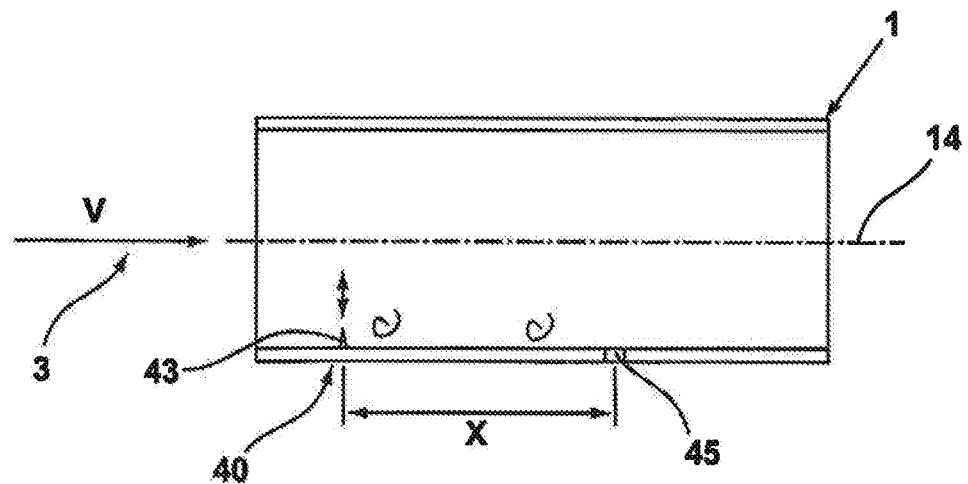
FIG. 4 is a schematic of a sectional view of a fourth embodiment of a device for determining the flow velocity in a hollow body.

FIG. 4 differs from the previous figures only in that at least one disturbing element, which can be extended into the volume flow transversely to the center longitudinal axis of the hollow body, is disposed on the wall of the hollow body. Here too, the extension of the disturbing element 43 transversely to the center longitudinal axis 14 of the hollow body induces disturbances in the fluid flow, which can be detected by the sensor 45 in the wall of the hollow body. The sensor is disposed at a distance (distance X) from the disturbing element 43 in the wall of the hollow body.

Figure 5:
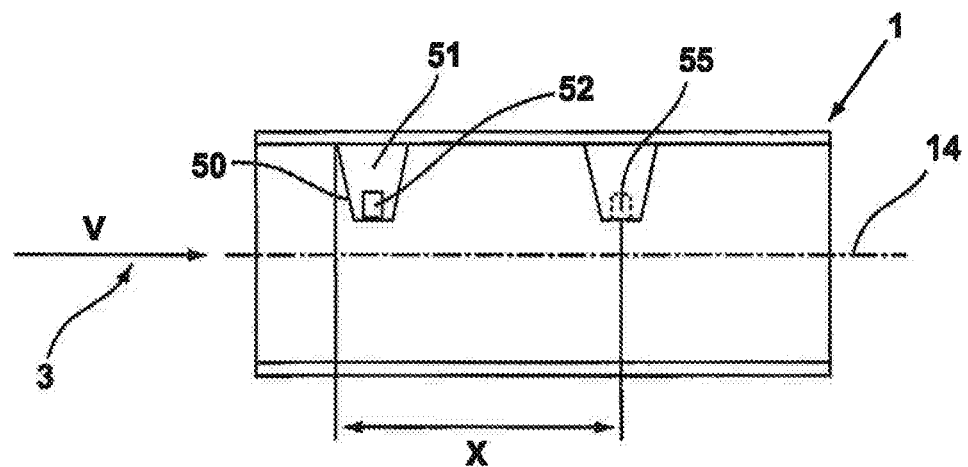
FIG. 5 is a schematic of a fifth embodiment, in which both the disturbance device and the sensor comprise a piezoelement.

FIG. 5 shows a disturbance device 50 with a baffle body 51, which holds a piezo-element 52. A sensor 55, which is also equipped with a piezo-element 52, in order to detect the disturbances induced in the fluid by the disturbance device 50 by way of the piezo-element 52, is located at a distance from the baffle body 51 with the piezo-element 52. The sensor 55 is also disposed at a distance (distance X) from the baffle body 51.

It will be apparent to those skilled in the art that various modifications and variations can be made in the present disclosure without departing from the scope of this disclosure. It is to be understood that the detailed description of the present disclosure are exemplary and explanatory and are intended to provide further explanation of the disclosure. It is not intended to be exhaustive or to limit embodiments to the precise form disclosed.

LIST OF REFERENCE NUMBERS 1 hollow body
10 disturbance device
11 baffle body
12 nose
13 disturbing element
14 center longitudinal axis
15 sensor
20 disturbance device
21 baffle body
23 wing-like disturbing element
25 sensor
26 streamlined support
27 arrow
30 disturbance device
32 recess
34 piston
34a piston head
35 sensor
43 disturbing element
45 sensor
51 baffle body
55 sensor

The invention claimed is:

1. A device for determining the flow velocity of a fluid, comprising:
   a hollow body through which a fluid can flow;
   at least one disturbance device disposed in the hollow body, the at least one disturbance device being configured to generate changeable disturbances in the fluid flow; and
   at least one sensor for identifying disturbances that are induced in the fluid flow by the at least one disturbance device, wherein the at least one sensor is disposed at a distance downstream in a direction of the fluid flow from the at least one disturbance device,
   wherein the at least one disturbance device comprises a recess in a wall of the hollow body and a displacement body that is movably disposed inside the recess in the wall.

2. The device of claim 1, wherein the displacement body is formed as a piston.

3. The device of claim 2, wherein a piston head of the piston is disposed at a distance from a lateral hollow body wall in the recess.

4. The device of claim 2, wherein the piston disposed in the recess is movable parallel to a center longitudinal axis of the hollow body.

5. The device of claim 2, wherein the piston disposed in the recess is movable transversely to a center longitudinal axis of the hollow body.

6. The device of claim 1, wherein the at least one sensor for identifying disturbances is selected from the group consisting of a pressure sensor and a piezoceramic sensor.

7. A method for determining the flow velocity of a fluid, comprising:
   providing a device according to claim 1;
   generating a disturbance in the fluid flow by the at least one disturbance device;
   identifying the disturbance by the at least one sensor;
   determining a time period between the generation of the disturbance and the identification of the disturbance; and
   determining a flow velocity of the fluid flow for the distance between the at least one disturbance device and the at least one sensor based on the time period.

8. The method of claim 7, wherein the disturbance device is inducing at least one impulse or one impulse sequence in the fluid flow.

9. The method of claim 8, wherein the at least one impulse or the at least one impulse sequence is generated by a piezo-element.

10. The method of claim 7, wherein a frequency of the individual at least one impulses or a frequency of the impulse sequences is controllable.

* * * * *